United States Patent
Van Horn et al.

(10) Patent No.: US 6,631,356 B1
(45) Date of Patent: Oct. 7, 2003

(54) DEMAND AGGREGATION THROUGH ONLINE BUYING GROUPS

(75) Inventors: Tom Van Horn, Bellevue, WA (US); Niklas Gustafsson, Bellevue, WA (US); Dale Woodford, Redmond, WA (US)

(73) Assignee: Vulcan Portals, Inc., Seattle, WA (US)

( * ) Notice: Subject to any disclaimer, the term of this patent is extended or adjusted under 35 U.S.C. 154(b) by 0 days.

(21) Appl. No.: 09/270,219

(22) Filed: Mar. 15, 1999

(51) Int. Cl.⁷ .............................................. G06F 17/00
(52) U.S. Cl. ........................................... 705/26; 705/27
(58) Field of Search ............................. 705/1, 14, 26, 705/27

(56) References Cited

U.S. PATENT DOCUMENTS

| | | |
|---|---|---|
| 3,581,072 A | 5/1971 | Nymeyer |
| 4,567,359 A | 1/1986 | Lockwood |
| 4,789,928 A | 12/1988 | Fujisaki ............... 364/401 |
| 4,949,248 A | 8/1990 | Caro |
| 5,148,365 A | 9/1992 | Dembo ............... 364/402 |
| 5,255,184 A | 10/1993 | Hornick et al. ............ 364/407 |
| 5,270,921 A | 12/1993 | Hornick ............... 364/407 |
| 5,377,095 A | 12/1994 | Maeda et al. |
| 5,576,951 A | 11/1996 | Lockwood |
| 5,615,109 A | * 3/1997 | Eder ............... 705/8 |

(List continued on next page.)

FOREIGN PATENT DOCUMENTS

| | | |
|---|---|---|
| WO | WO 00/11570 | 3/2000 |
| WO | WO 00/30004 A1 | 5/2000 |
| WO | WO 00/30005 A1 | 5/2000 |
| WO | WO 00/34841 A2 | 6/2000 |
| WO | WO 00/34842 A2 | 6/2000 |
| WO | WO 00/34843 A2 | 6/2000 |
| WO | WO 00/34886 A1 | 6/2000 |
| WO | WO 45318 A1 | 8/2000 |

OTHER PUBLICATIONS

Letter from Woolcott dated Aug. 31, 1999 and Search Report.

(List continued on next page.)

Primary Examiner—Wynn Coggins
Assistant Examiner—Forest Thompson
(74) Attorney, Agent, or Firm—Fenwick & West LLP

(57) ABSTRACT

An online buying group (referred to herein as a "co-op") is formed for the specific purpose of purchasing a particular product at (102) by defining a start time, end time, critical mass, any minimum number of units offered, any maximum number of units offered, starting price and product cost curve. As data is gathered from buyers, by means of their making binding purchase offers, the co-op is modified at (108) using a pricing tool, so as to take into account for this market data in the definition of the price curve. A buyer chooses a product co-op of interest at (114). The buyer is presented with the following essential co-op information: current price, closing time, next price level (as defined by a price curve visibility window and the price curve) sufficient to entice the buyer to make an offer. Once a buyer has made up his mind, the decision must be made at (116) to offer a purchase price which includes the current price, guaranteeing availability if critical mass has been achieved, or to make an offer at a lower price range that can be accepted only if the co-op price drops to that level, which may not occur. Given a decision to make an offer at such lower price, the buyer enters such maximum price at which he is willing to purchase the product at (118). Should the current price drop to the level at which the offer was made, the price contingency is removed from such offer and assuming critical mass is achieved, the offer is accepted at at the close of the co-op at (122), and processed accordingly. Inventory is allocated to fulfill the accepted offer at (126) following the closing of the co-op at (124).

33 Claims, 6 Drawing Sheets

U.S. PATENT DOCUMENTS

| | | | |
|---|---|---|---|
| 5,640,569 A | 6/1997 | Miller et al. | |
| 5,712,985 A | 1/1998 | Lee et al. | |
| 5,724,521 A | 3/1998 | Dedrick | |
| 5,727,165 A | 3/1998 | Ordish et al. | |
| 5,729,700 A | 3/1998 | Melnikoff | 395/236 |
| 5,745,882 A | 4/1998 | Bixler et al. | |
| 5,758,327 A | 5/1998 | Gardner et al. | |
| 5,758,328 A | 5/1998 | Giovannoli | |
| 5,765,143 A | 6/1998 | Sheldon et al. | |
| 5,794,207 A | 8/1998 | Walker et al. | 705/23 |
| 5,794,219 A | 8/1998 | Brown | |
| 5,797,127 A | 8/1998 | Walker et al. | 705/5 |
| 5,799,284 A | 8/1998 | Bourquin | |
| 5,806,047 A | 9/1998 | Hackel et al. | |
| 5,809,144 A | 9/1998 | Sirbu et al. | |
| 5,818,914 A | 10/1998 | Fujisaki | |
| 5,826,244 A | 10/1998 | Hubermann | |
| 5,832,459 A | 11/1998 | Cameron et al. | |
| 5,835,896 A | 11/1998 | Fisher et al. | 705/37 |
| 5,842,178 A | 11/1998 | Giovannoli | |
| 5,845,265 A | 12/1998 | Woolston | 705/37 |
| 5,845,266 A | 12/1998 | Lupien et al. | |
| 5,890,137 A | 3/1999 | Koreeda | |
| 5,890,138 A | 3/1999 | Godin et al. | |
| 5,895,454 A | 4/1999 | Harrington | |
| 5,897,639 A | 4/1999 | Greef et al. | |
| 5,913,210 A | 6/1999 | Call | |
| 5,915,209 A | 6/1999 | Lawrence | |
| 5,950,176 A | 9/1999 | Keiser et al. | |
| 5,956,709 A | 9/1999 | Xue | |
| 5,983,199 A | 11/1999 | Kaneko | |
| 6,021,398 A | 2/2000 | Ausubel | 705/37 |
| 6,026,383 A | 2/2000 | Ausubel | 705/37 |
| 6,041,308 A | 3/2000 | Walker et al. | 705/14 |
| 6,078,897 A | 6/2000 | Rubin et al. | 705/14 |
| 6,085,169 A | 7/2000 | Walker et al. | 705/26 |
| 6,101,484 A * | 8/2000 | Halbert et al. | 705/26 |
| 6,141,653 A | 10/2000 | Conklin et al. | 705/80 |
| 6,269,343 B1 * | 7/2001 | Pallakoff | 705/26 |

OTHER PUBLICATIONS http://www.storesearch.com/.

http://shop.netscape.com/auctions/main.adp.

Http://auctions.yahoo.com/.

Http://www.lycos.com/Shopping/sales_and_specials/.

Dialog, The Gale Group Newsletter, "New Twist to Online Shopping: Service Hopes to Break Customer Apathy," Internet Week, 1(7), May 22, 1995.

Dialog, The Gale Group Newsletter, "In Year 2020, Auctions and Agents to Rule Web," Newsbytes, Mar. 23, 1998.

Dialog, "New Tricks in Pet Supplies" by Minkoff, J., Discount Merchandiser, 34(12)70–72, 1994.

Online Document from Software Patent Institute Database of Software Technology, http://m.spi.org/, Record 1: "Management Data Processing," Serial No. acmr6512.0039, Printed Sep. 20, 1999.

Online Document from Software Patent Institute Database of Software Technology, http://m.spi.org/, Record 2: "Management Science," Serial No. ACMGCL89.1066, Printed Sep. 20, 1999.

Online Document from Software Patent Institute Database of Software Technology, http://m.spi.org/, Record 17: "Distribution Resource Planning," Serial No. HPAPPS.2620, Printed Sep. 20, 1999.

Online Document from IBM Intellectual Property Network, http://www.patents.ibm.com/, Titled: Personalized Optimized Decision/Transaction Program, Jan. 1995, Reprinted Nov. 24, 1999.

Online Document from Agorics, Inc., http://www.agorics.com/, Sections: "A Survey of Auctions," "English Auction," "A Dutch Auction," "The First Price Auction," "The Vickrey Auction," "The Double Auction," "Auction Offshoots," "Auction Stategies," "Auction Histories," "Government Securities—Auctioned Off," "Collusion in Auctions," "Auction Bibliography," Dated 1996, Reprinted Oct. 25, 1999.

Management and Specialist Team, LetsBuyIt.com, http://www.euroferret.com, Jan. 15, 1999; Online Document, http://www.alumni.se/e–commerce/default.htm, Jan. 15, 1999, Printed Nov. 19, 1999.

Online Document from Bid.com, http://www.bid.com/dutch, Printed Sep. 03, 1999.

Online Document from Bullnet Online Auctions, http://www.bullnet.co.uk/auctions/info.htm, Printed Sep. 03, 1999.

Online Document from Who's Who for The Commerce Standard, http://www.gii.com/standard/who/index.html. Printed Nov. 19, 1999.

Online Document from Cooperative Educational Service Agency, http://www.cesa5.k12.wi.us/buying.htm, Printed Sep. 20, 1999.

Online Document from Franklin Regional Council Governments, http://www.frcog.or/purch.html, Printed Sep 20, 1999.

Online Document from Klik–Klok Online Dutch Auction, http://www.klik–klok.com/how.htm, Printed Sep. 03, 1999.

Online Document, ComputerSweden, "Icon–grundare satsar närmare halv miljard på e–handel," http://nyheter.idg.se, Jan. 23, 1999 (w/English translation).

Online Document from Artiklar från AffärsData ("Resumé"), http://www.ad.se, Feb. 25, 1999 (w/English translation).

Online Document from ComputerSweden, "Lke;; Spångberg . . . ," http://nyheter,idg.se, Mar. 3, 1999.

Online Document from Accompany: About Team, http://www.accompany.com/about_press_faq.asp, Printed Mar. 03, 1999.

Online Document from Accompany: About US, http://www.accompany.com/about_press_0.asp, Printed Mar. 03, 1999.

Online Document from Accompany: About Team, http://www.accompany.com/about_team.asp, Printed Mar. 03, 1999.

Online Document from Accompany: About Team Advisors, http://www.accompany.com/ablut_team _advisors.asp, Printed Mar. 03, 1999.

Online Document from Accompany: About Team, http://www.accompany.com/about_press_analyst.asp, Printed Mar. 03, 1999.

Online Document from Accompany: About Team Advisors, http://www.accompany.com/about_teampartnes.asp, Printed Mar 03, 1999.

Online Document from Accompany: Contact, http://www.accompany.com/about_contact.asp, Printed Mar 03, 1999.

Online Document from Ask Reggie Domain Search, Accompany.com Domain contacts, http://www.askreggie.com, Printed Mar. 03, 1999.

Online Document from Accompany: About US, http://www.accompany.com/about_press_background.asp, Printed Mar. 03, 1999.

Online Document from ZDNN, http://www.zdnet.com/stories/news, Printed Mar. 03, 1999.

NewsAlert, "Accompany, Inc. to Revolutionize Commerce; Buys Come Together for Best Value," http://www.accompany.com, Printed Mar. 03, 1999.

Online Document from Yahoo, "Web startup pushes volume shopping," http://dailynews.yahoo.com, Printed Mar. 04, 1999.

Abstract, World Reporter, Dagens Industri, "Expected success for internet shopping," WL 5900897, Mar. 12, 1999.

U.S. application No. 60/119,220 Filing Receipt and Specification, "A method and apparatus for creating and managing groups for increasing buying power on the World Wide Web," Feb. 08, 1999.

Article from Sportfack, "Letsbuyit.com Kommer," Feb. 12, 1999.

IBM Technical Disclosure Bulletin, "Multi–Product Delivery System Optimization Procedure," 38(4):502–503,Apr. 1995.

Kroll et al., "World Weary Web," Forbes, Dec. 28, 1998, pp. 98–100.

Pant et al., "Business on the Web: Strategies and Economics," Fifth International WWW Conference, May 6–10, 1996, Paris, France.

Rockoff et al., "Design of an Internet–based System for Remote Dutch Auctions," *Internet Research:Electronic Networking Applications and Policy*, 5(4):10–16, 1995.

Stang et al., "Scans" Section, *Wired*, Sep. 1995, pp. 51, 54, 56 and 58.

Woolley, "Price War!," *Forbes*, Dec. 14, 1998, pp. 182 and 184.

Online Document from Forbes.com, http://www.forbes.com, Forbes Global, Computer Science Section of Dec. 28, 1998, "Coming Soon–Cyber Co–ops" by Karlgaard, Printed Nov. 16, 1999.

Press Release from MobShop, formerly known as Accompany, Inc., obtained from the Internet at http://www.mobshop.com/press_release?release=on Apr. 10, 2000, which explains that Accompany, Inc. received a Notice of Allowance from the U.S. Patent & Trademark Office.

Press Release from iCoop, Inc. obtained from the Internet at http://www.icoop.com/press_pressrelease2.htm on Apr. 10, 2000, which explains that iCoop, Inc. has filed two patent applications and has a provisional patent applications which were filed on Jan. 22, 1999.

Press Release from beMANY!obtained from the Internet at http://www.bemany.com/press02112000_be many.html on Apr. 10, 2000, which explains that be MANY! has a "patent pending process".

Press Release from the company BazaarE.com obtained from the Internet at http://www.bazaare.com/pr$_{13}$03111999.cfm? CFID=62916&CFTOKEN=75630214 on Apr. 10, 2000, which explains that BazaarE.com has a "patent–pending platform".

"Retail Federation Group Buying Set," HDF–The weekly Home Furnishings Newspaper, v0, n0, pg. 9, 26, Dec. 1994.

"Frontier Rings Up a Sale with National Retail Federation," PR Newswire, p119NYM057, Jan. 19, 1998.

"NRF: home page of World Wide Web (National Foundation Launches Site),"The Weekly Newspaper for the Home Furnishings Network, v70, n72, pg. 10(1), Oct. 14, 1996.

"Retail Federation Group Buying Set," HFD–The Weekly Furnishings Newspaper, v68, n52, pg. 9(1), Dec. 26, 1994.

"Mosher views ARA as survival kit for small specialty stores," Daily News Record, v24, n22, pg. 4(1), Feb. 2, 1994.

"KMART" Targets GE as EDI Provider Signals GE's Re–Commitment to EDI, EDI news, v11, n21, Oct. 13, 1997.

"National Federation Selects GE Information Services for EDI Service Partnership," PR Newswire, p1006DCM009, Oct. 6, 1997.

Mielczarski, W.; Michalik, G.; Widjaja, M.; "Bidding strategies in electricity markets," PIC Proceedings of the $21^{st}$ 1999 IEEE International Conference, pp. 71–76, 16–21 May 1999, Cat. 190 99CH36351, 1999.

Online Document from Dagens Industrial Rush into Net–shopping," *http://www.di.se/Scripts/*, Document dated Mar. 12, 1999, Printed Jan. 19, 2000 (with English Translation).

Online Document, "US–Il–Chicago–Cargo Revenue Management Analyst," "US–IL–Chicago –Revenue Manager," "US–IN–Indianapolis –Yield Analyst," "US–CA–San Jose –Financial Analyst," *http://jobsearch.monster.com*, Printed Mar. 24, 1999.

Online Document from hotjobs.com, "Filent Corporation," *http://www/hotjobs.com*, Printed Mar. 24, 1999.

Online Document from The Revenue Management Home Page, "Revenue Managment Defined," wysiwyg://212/http://www.geocities.com/WallStreet/Floor/4921/. Printed Mar 18, 1999.

Online Document from the Revenue Management Home Page, "Articles on Revenue Management," wysiwyg://212/http://www.geocities.com/Wallstreet/Floor/4921/articles.htm, Printed Mar. 18, 1999.

Online Document from the Revenue Management Home Page, "Companies Practicing Revenue Management," wysiwyg://212/http://www.geocities.com/Wallstreet/Floor/4921/rmcomps.htm. Printed Mar. 18, 1999.

Online Document from Revenue Management Systems, Inc., "What is Revenue Management?" *http://www.revenuemanagement.com/whatisrm.htm*, Printed Mar. 19, 1999.

Online Document from profitoptim.com, "Definition of Revenue Management," *http://www.profitoptim.com/papersdirectory/rmdaybrief/sld063.htm*, printed Mar. 19, 1999.

Online Document from profitoptim.com, "What is Revenue Management (cont.) !" *http://www.profitoptim.com/papersdirectory/resexpo97/sld006.htm*, Printed Mar. 19, 1999.

Online Document from American Way, "How Airline Pricing Works," *http://www.aa.com/away/Vantage/Vantage–may98.htm*, Printed Mar. 18, 1999.

Online Document from Airline Discount, *http://faculty.darden.edu/pfeiferp/airline.htm*, Printed Mar. 18, 1999.

Online Document from the Innovation Network, "1994 Innovation Collection," *http://198.49.220.47/texis/si/sc/i...e/+KOEMUi3Ww/full.html*, Printed Mar. 19, 1999.

Online Article by W. Lieberman of Veritec Solutions, Inc., "Yield Management: System or Program?"*http://www.veritecsolutions.com*, Site visited on Mar. 19, 1999.

Online Article by W. Lieberman of Veritec Solutions, Inc., "Making Yield Managment Work for You: Ten Steps to Enhanced Revenues," *http://www.veritecosolutions.com*, Site visited on Mar. 19, 1999.

Online Article by W. Lieberman of Veritec Solutions, Inc., "Debunking the Myths of Yield Management" *http://www.veritecsolutions.com*, Site visited on Mar. 19, 1999.

Online document from Savvio.com, "Savvio.com: Our Story," wysiwyg://8/http://www.savvio.com/about/aboutUs.jsp, Printed Sep. 28, 2000.

Search Report dated Sep. 8, 1999 for patent application Ser. No: 09/281,859, Attorney Docket No: MCTA–002/00US.

Search Report dated Nov. 22, 1999 for patent application Ser. No. 09/409,237, Attorney Docket No: MCTA–003/01US.

Internet World (Mecklermedia), Cliff Figallo, "Hosting Web Communities," Building Relationships, Increasing Customer Loyality, and Maintaining a Competitive Edge.Published by John Wiley & Sons, Inc., Copyright 1998.

Online Document from OCM, *http://www.cynric.org/OCM/administration/management/services/coop.html*, printed 20–Sep–1999.

U.S. provisional application No. 60/097,932, Pallakoff, filed Aug. 25, 1998.

U.S. provisional application No. 60/097,933, Pallakoff, filed Aug. 25, 1998.

Search Report for PCT/US01/19013 dated Nov. 15, 2001.

Ferranti, Marc; "Electronic Commerce: Ties That Bind;" InfoWorld, vol. 19, n14, pp. 59–62, Apr. 7, 1997.*

Negromante, Nicholas; "Psst! Transactions," Forbes, 80th Issue, Jul. 7, 1997.*

Bailey et al.; "An Exploratory Study of the Emerging Role of Electronic Intermediaries," International Journal of Electronic Commerce, vol. 1, n3, pp. 7–20, Spring 1997.*

Sairamesh et al.; "Economic Framework for Pricing and Charging in Digital Libraries," D–Lab Magazine, ISSN 1082–9873, Feb. 1996.*

Lai, Rajiv; Staelin, Richard; "An Approach for Developing an Optimal Discount Pricing Policy," Management Science, vol. 30, n12, #1524, Dec. 1997*

"ONSALE Home;" ONSALE; Sep. 1997.*

"About ONSALE;" ONSALE; 1996.*

"Christmas Wishes 1991;" Current Catalog; 1991.*

* cited by examiner

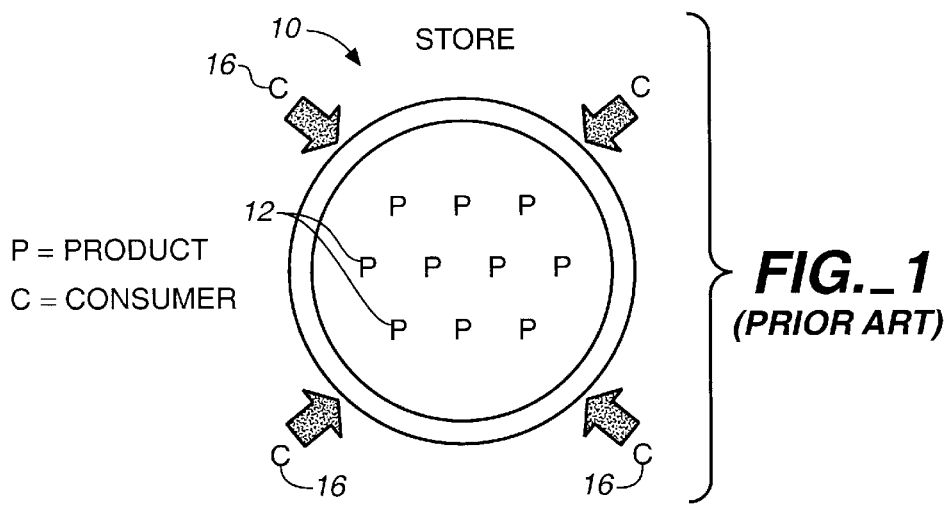
FIG._1 (PRIOR ART)
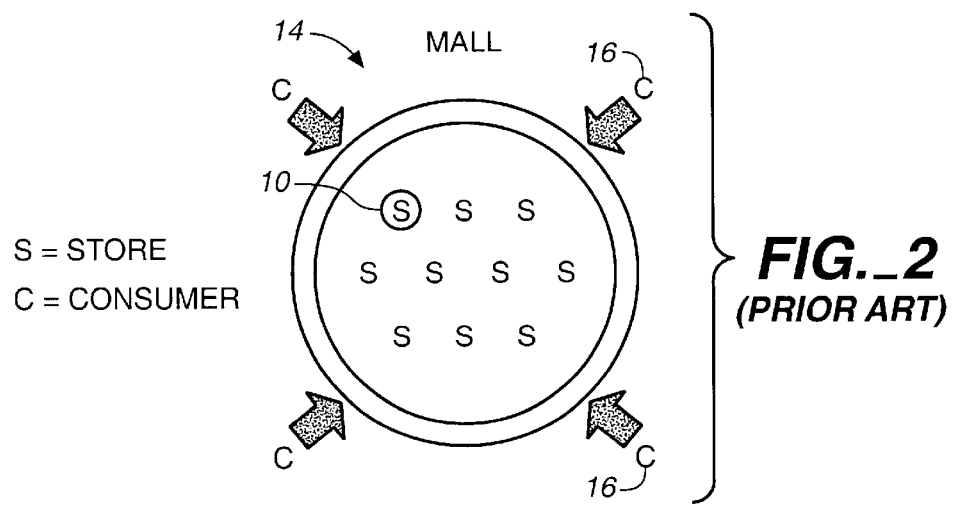
FIG._2 (PRIOR ART)
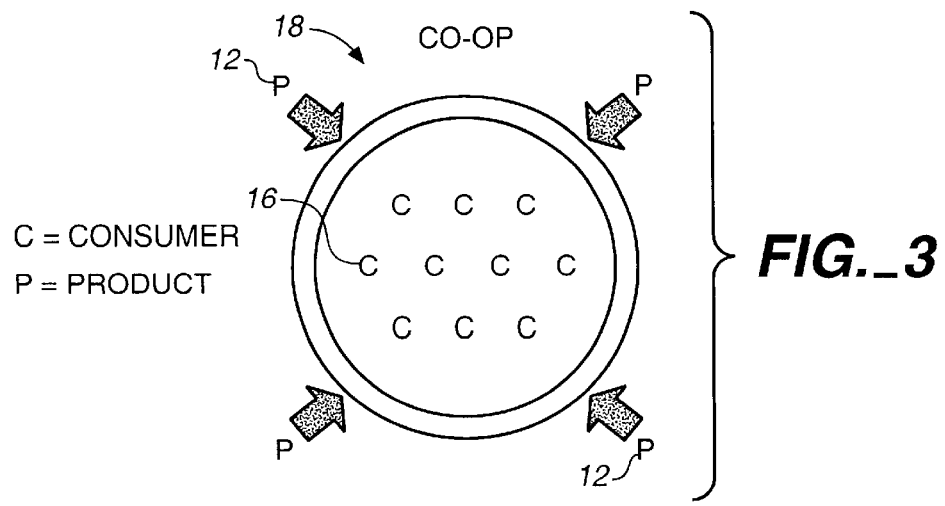
FIG._3

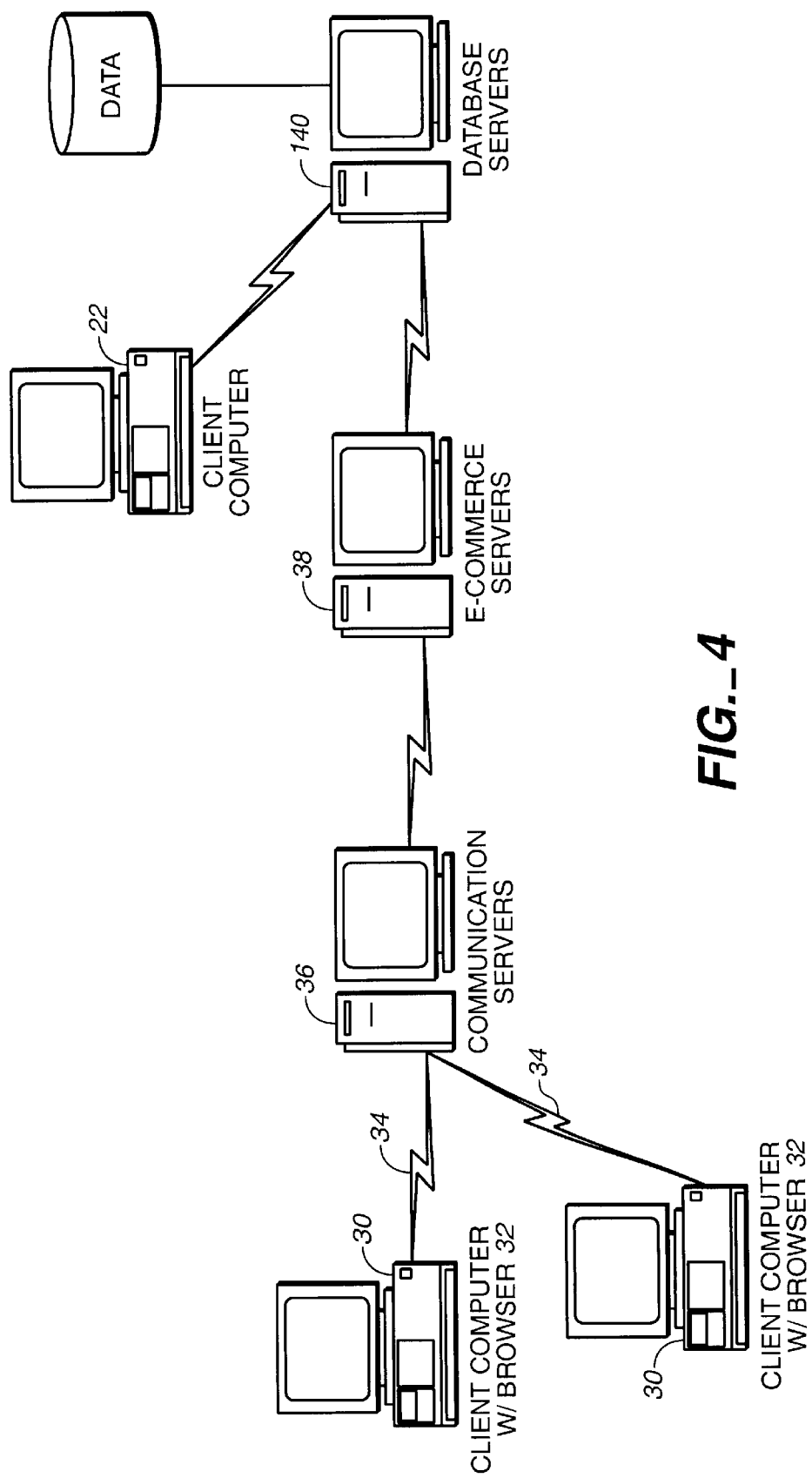
FIG._4

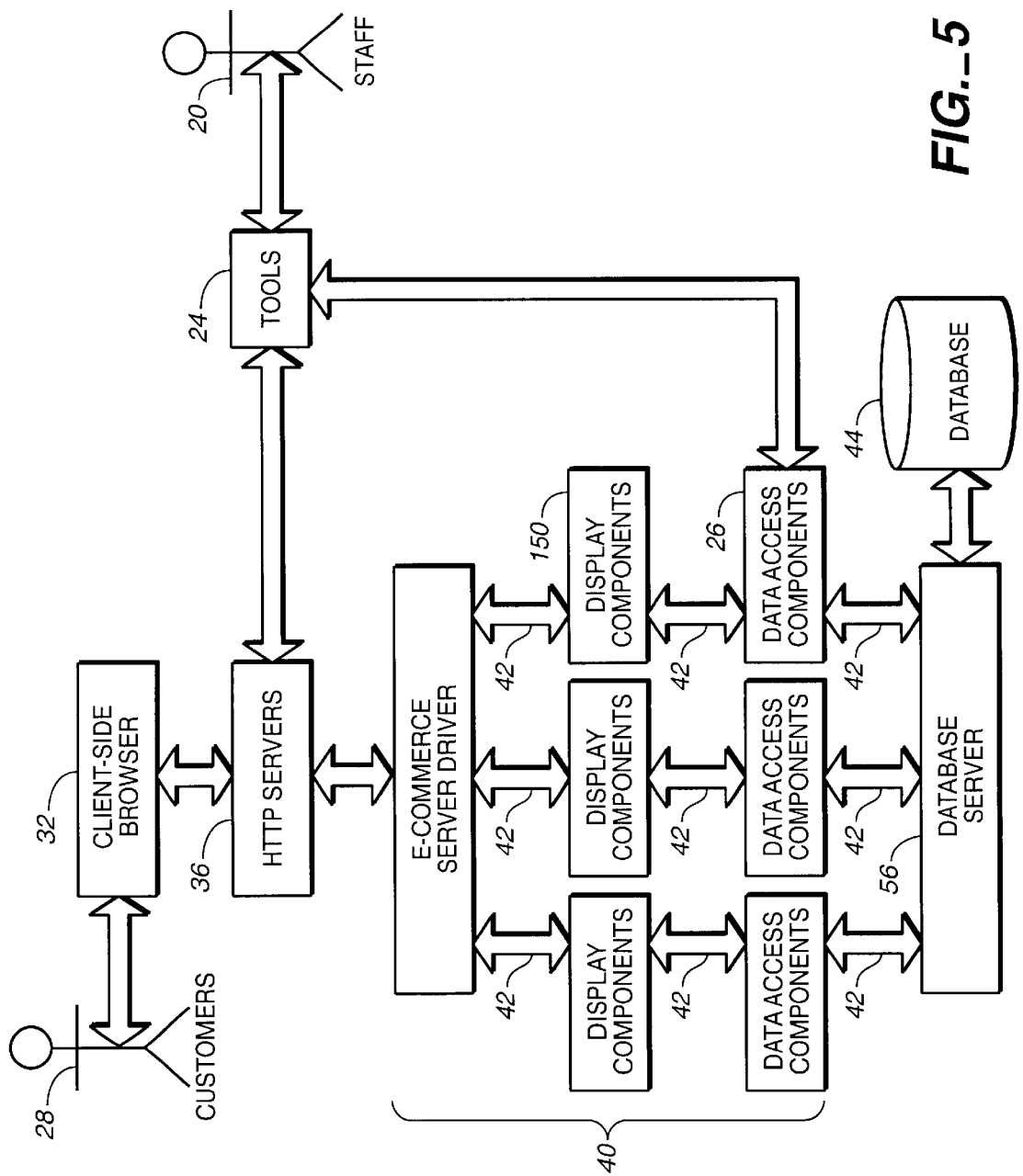
FIG._5

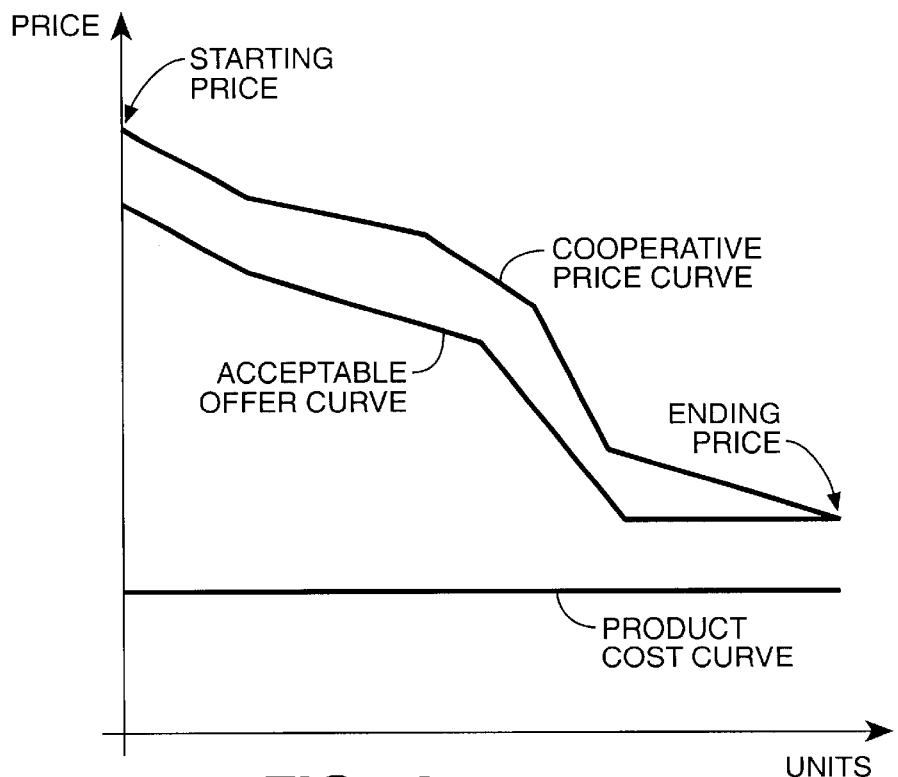
FIG._6
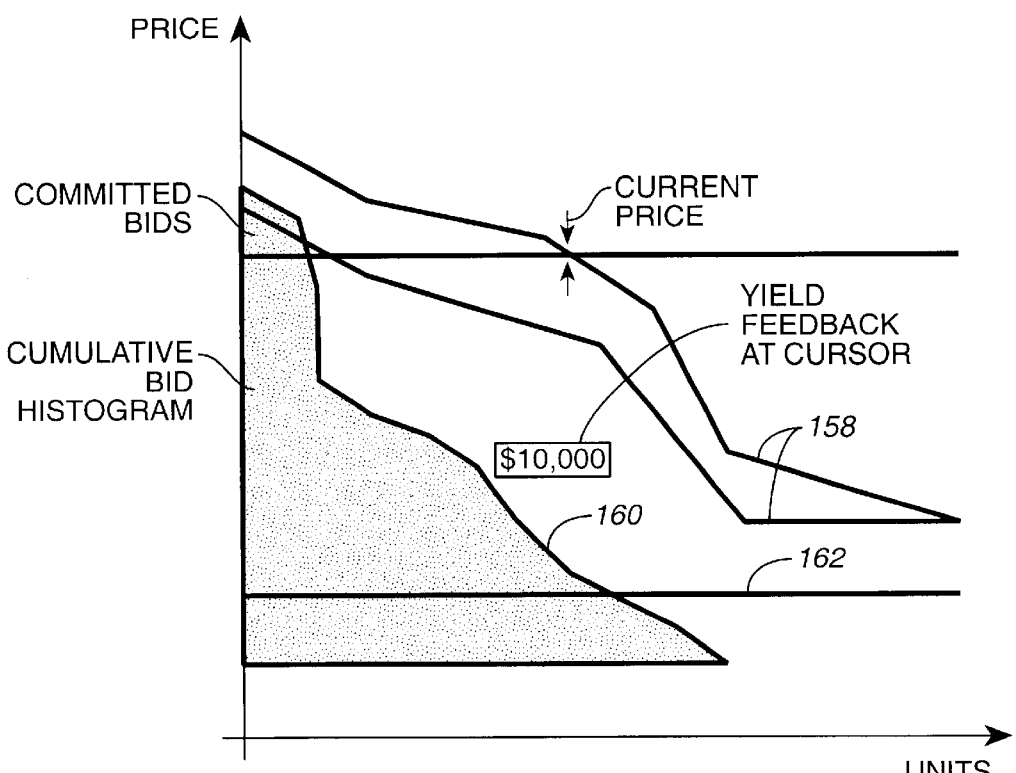
FIG._9

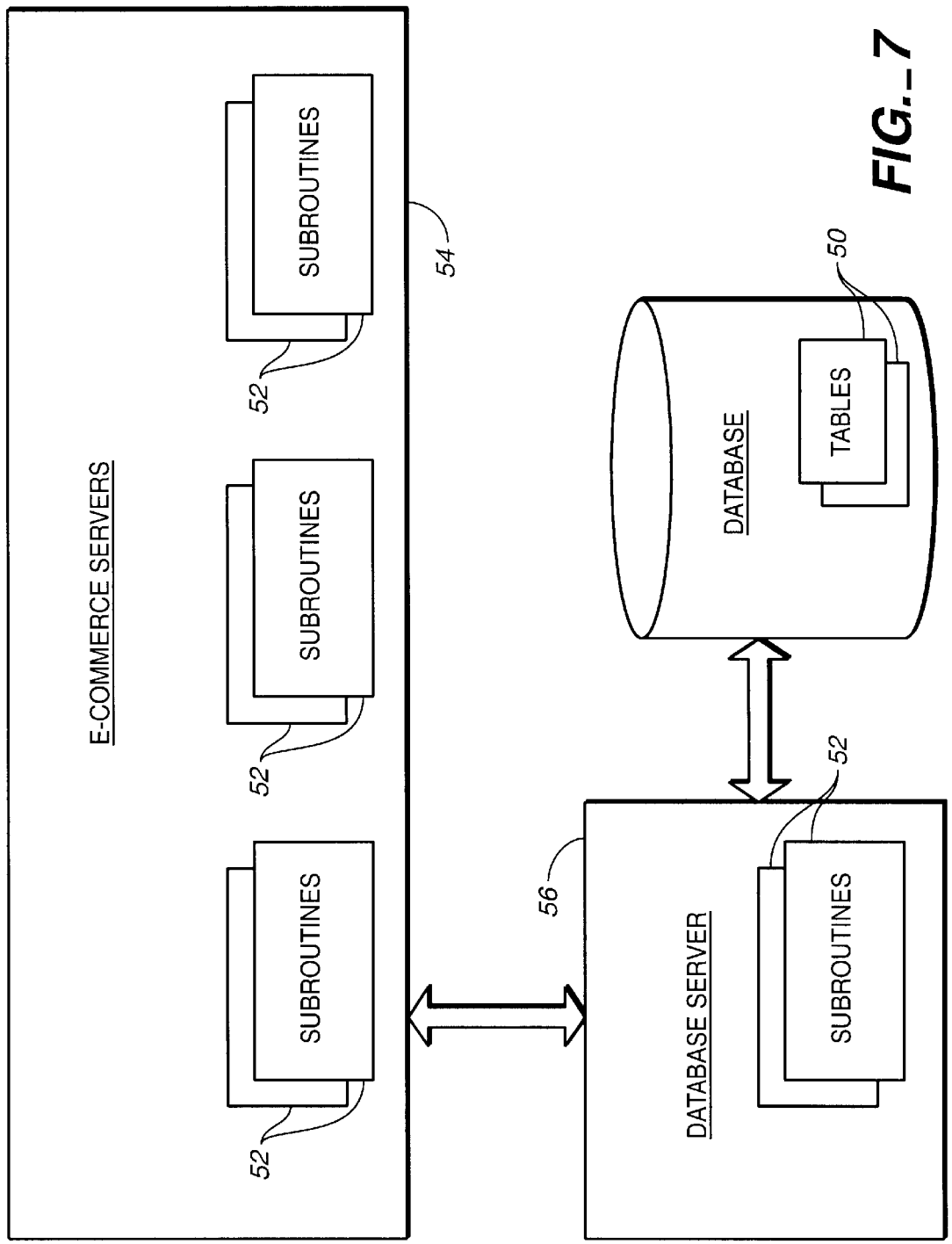

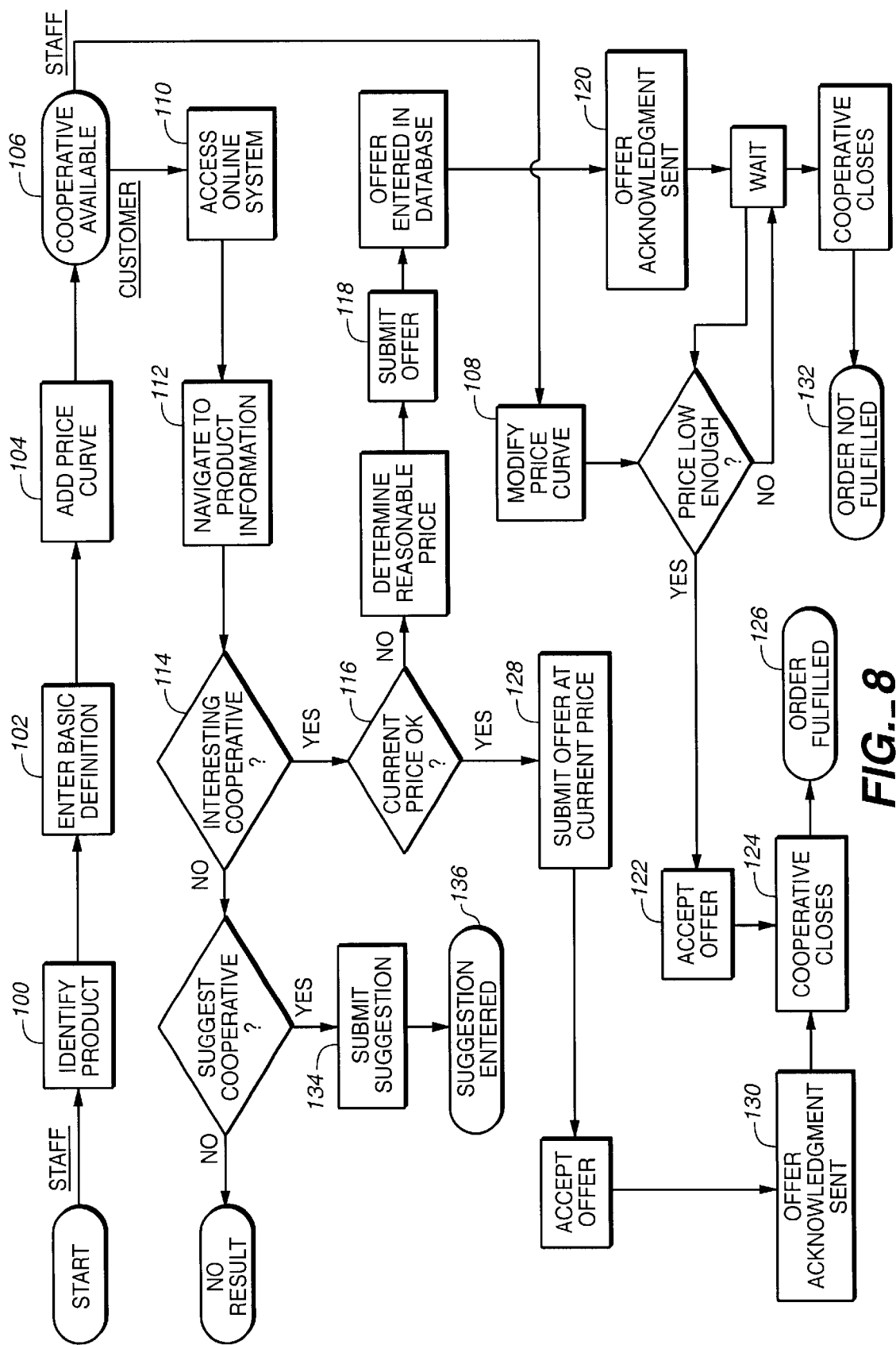
FIG._8

DEMAND AGGREGATION THROUGH ONLINE BUYING GROUPS

BACKGROUND OF THE INVENTION

1. Field of the Invention

The present invention relates to demand aggregation for goods and services and the computerized operation of global buying groups conducted over electronic networks such as the Internet.

2. Introduction to the Invention

This invention provides a method and apparatus to globally locate, encourage and enable all buyers wishing to purchase a particular product or service within a given time frame to join forces in a buying group ("co-op") formed specifically to accomplish the desired purchase. The co-op will enable individual buyers to leverage their combined purchasing power to achieve an economic bargain far superior to that attainable by any one buyer acting alone. This superior bargain most often will be reflected in terms of a lower price.

The invention also provides a method and apparatus that allows each buyer an opportunity to increase the volume of any given co-op in order to further increase group buying power within a co-op. It also includes a mechanism through which buyers can form any number of special interest groups, provide their collective wisdom to dictate which products are featured in future co-ops, or even make a market for a given product or service.

Other key aspects of the invention include a means to allow unprecedented access to certain market and pricing information derived from co-op member input during the life of each co-op. For example, all buyers wishing to join a co-op must submit a binding offer guaranteeing their willingness to purchase the featured item at or below some maximum price determined by each individual member. This collection of purchase offers provides valuable quantitative data regarding price sensitivity for the featured item. In addition, it permits real time yield management decisions that often will benefit both buyers and suppliers. Specifically, the invention provides data from which a supplier can be informed that if the product price is reduced by a specified amount, the co-op's pool of accepted offers-i.e., final sales-will increase by a specific quantity. The guaranteed increase in volume due to a reduced price would improve its overall yield. Under this scenario, both the co-op buyers and the product supplier benefit from the indicated price reduction.

Other ways in which this invention provides unique benefits to buyers and suppliers of goods and services in electronic commerce are set forth in various parts of this document below.

3. Background (Prior art)

Buyer Problems to be Solved by the Invention

The vast majority of retail methods of commerce do not permit any give and take between buyer and seller regarding terms of purchase. Instead they employ a seller-controlled format whereby the seller determines which items are to be offered for sale, when each item will be offered for sale, and the non-negotiable fixed price at which each item will be sold. Traditional stores (including most on-line stores), catalog sales, telemarketing sales, and classified ads all represent examples of this prevalent seller-controlled sales environment.

While the auction sales format permits buyer interaction, it too vests most of the bargaining power in the seller by permitting him or her to select the item to be sold and the time at which it will be offered for sale. Auctions also typically permit the seller to specify a minimum price at which the item may be sold. Moreover, the auction model further deteriorates the power of each individual buyer by pitting him or her against similarly situated buyers, all competing to pay the highest price for the item.

Historically, individual buyers have sought to achieve collective buying power, among other things, by joining a traditional, true "co-op"—i.e., an organization that is actually owned by and operated for the benefit of those using its services. Such organizations usually are comprised of individual members with common business, occupational. or recreational interests. Members of these tine co-ops pay annual membership fees (typically sufficient to cover the operating costs of the co-op entity) for the privileges of membership, which often include access to information, products and services related to the co-op's defined purpose.

Traditional buying co-ops (including those emerging on the Internet up to the date of this invention) have been organized around a common set of interests much broader than a particular product (e.g., a digital camera), or even a narrowly defined product category (e.g., cameras). As a result, the extent to which they can aggregate demand for any given product or service is limited by the organization's defined membership base and topical focus. Historically, this breadth of member commonality was required. Otherwise, the benefits achieved through the co-op would be vastly outweighed by the amount of time, money and energy expended to join and maintain the membership.

At the time of this invention, buying groups organized globally on a purchase by purchase basis do not exist. In addition, there is no single mechanism though which people can quickly and conveniently create or join any special interest group of their choosing for purchasing products through a global electronic network such as the Internet.

Supplier Problems to be Solved by the Invention

Traditionally, market data regarding the price buyers are willing to pay for a given product or service has been derived primarily from actual sales data. These estimates fail to capture data regarding instances in which sales were rejected by those deciding not to buy the given product. Obviously, the universe of buyers seriously considering purchasing a new flat screen TV includes not only those who will decide to purchase the item, but any number of people who will conclude the current unilaterally fixed price for the item is too high. Under traditional sales models, there is no practical way to capture the number of potential buyers who rejected the sale based on price. Moreover, there is no way to capture the actual price point at which the potential buyer would have purchased the item. If an invention were to permit access to this data globally for a large pool of potential buyers, the invention would be extremely valuable to suppliers of goods and services in that it would permit better pricing, yield management and marketing decisions.

Further, historically there has been no way for a supplier to predict with certainty the price at which a product must be sold in order to increase sales volume by a specified amount. Under traditional sales models, pricing decisions are made based on estimates, such as anticipated product demand and presumed price sensitivity, in the hope that supply will approximate demand at the selected price. If a supplier of a particular item could rely on guaranteed purchase offers to increase volume at varying levels of acceptable sales prices, such information would be extremely valuable to the supplier. Among other things, it would permit instantaneous, accurate yield management decisions that often would encourage win-win price reductions. The supplier wins by improving his overall yield based on volume, and the buyer wins by getting a lower per unit price.

Further, existing sales models do not offer suppliers a clearly superior means of quickly reducing large quantities of specific product inventory (such as a close out item) in a way that will permit both maximization of yield and fast movement of an extremely large quantity of product. Similarly, there exists no clearly superior sales channel through which a supplier can readily turn to swiftly create an extremely large, global market for a specific product such that the supplier's market share for that product literally could substantially increase overnight.

Finally, access to the larger interest groups enabled by this invention present a superior forum for marketing and testing products and services of interest to the membership of a given group. Such activities may be limited to those which are deemed by any given group to be of mutual beneficial to both individual group members and the suppliers of goods and services of interest to such group.

Specific examples of e-commerce systems implemented on the Internet or other networks are disclosed in the following issued patents: U.S. Pat. No. 4,789,928, issued Dec. 6, 1988 to Fujisaki; U.S. Pat. No. 5,794,207, issued Aug. 11, 1998 to Walker et al.; U.S. Pat. No. 5,797,127, issued Aug. 18, 1998 to Walker et al.; U.S. Pat. No. 5,835,896, issued Nov. 10, 1998 to Fisher et al. and U.S. Pat. No. 5,845,265, issued Dec. 1, 1998 to Woolston.

4. Benefits of the invention

Buyers

The traditional shopping experience-buying goods at stores and malls (whether on line or brick and mortar)-was designed by sellers with the primary purpose of promoting commerce for themselves. Not surprisingly, this prevalent sales model gives the seller virtually all of the power and control associated with a given sales transaction. This invention creates a new shopping experience by essentially reversing certain aspects of the traditional seller-oriented sales model. The result is a far more empowering shopping experience for the buyer.

As shown in FIG. 1, a store 10 is simply a collection of products 12. As shown in FIG. 2, a mall 14, of course, is a collection of stores 10. Historically, buyers 16 have had to come to the seller's pre-selected and pre-priced collection of products 12 in order to make a purchase. This invention, represented in FIG. 3, turns the point of sale into a collection of buyers 16 (the "co-op"), rather than products 12. It further permits these co-ops to be located among any number of other co-ops at an Internet or other network site provided by a business entity implementing the invention. This fundamental shift in structure provides many advantages each discussed in detail below.

By creating a means to globally aggregate a large number of buyers in one place at one time (a co-op), this invention enables a tremendous shift in power from the seller of goods and services to the buyer of goods and services. Rather than permitting the product seller to establish the product's sales price, it permits each buyer to establish a maximum price at which he or she will purchase the product. (Notwithstanding this specification of a maximum acceptable price, all co-op members enjoy the full measure of price reductions achieved through the co-op. Hence, each member's offer will be accepted at the co-op's lowest—i.e., the ending—price.)

Co-op members are further empowered by certain other features of the invention. Specifically, after joining a given co-op each member will be given an opportunity to drive volume to further reduce prices by e-mailing people he or she knows who might be interested in joining the co-op. In this way, every member can help the co-op attain its critical mass (which guarantees the success of the co-op) and surplus volume (which serves to drive prices below previously anticipated levels). In addition, the invention permits buyers to help choose which products and brands will be featured in future co-ops. Through this feature, buyers also can actually create a market for a particular product. For example, this input feature would permit a general query regarding whether there is sufficient buyer interest for a particular style of wristwatch (in which one or more buyers had previously inquired). If sufficient demand for the item exists, a business entity implementing the invention could then seek out a jewelry manufacturer willing to make a large volume of the watches and then offer such items to those who expressed interest and potentially others in a future co-op.

The invention's method presents a buying model far superior (from the standpoint of the buyer) to that of the auction sales model. Rather than providing a method by which numerous buyers compete against one another to be the "winner" at the highest price, this method enables buyers to join forces to achieve a lower price at which they all "win".

Further, the invention provides an effective method for focused aggregation of purchasing power (i.e., all people currently willing and able to purchase a featured product without regard to their geographic location, profession, or any conflicting or specific personal interests of the individual buyers within the group). This method of aggregation will generate far greater participation and purchasing power than any traditional co-op. To illustrate this point, consider a typical "small business" co-op. It likely would generate some demand for a particular premium brand computer printer. However, it normally would be limited in its geographic reach. And even if the co-op were operated globally via the internet, its demand would not encompass all people using the internet who might be interested in buying that particular printer. It would include only small business owners (or more likely owners of a particular type of small business). The ability to quickly, conveniently and economically form narrowly defined co-ops is a critical aspect of this invention which is made possible by the technology comprising this invention when coupled with a global electronic network such as the Internet.

The method and apparatus of this invention farther provides a means through which individual buyers can aggregate on the basis of broader interest groups for any purpose including access to the latest product and other information of interest to the group.

Benefits to Suppliers

In order to join a co-op, each buyer must determine the maximum price at which (or below) he or she is willing to purchase the featured item. Such amount is specified in his or her binding purchase offer. That offer is guaranteed by the buyer's credit card. All offers including the various amounts at which they are submitted are collected and summarized in a database. This process enables accurate, real-time yield management decisions which can be used to advocate a lower per unit price. For example, the business entity implementing the invention would be able to represent to a supplier that if the price were lowered by $X, the sales volume will increase by an additional 1,000 units. Although the per unit price would drop, the supplier's overall profit yield may increase due to the substantial increase in volume. Hence, this invention eliminates the uncertainty that often makes suppliers reluctant to lower prices.

In addition, the pricing data described above represents an extraordinarily complete picture of the price sensitivity with respect to a given product because it captures not only actual sales data, but also price specific data on potential sales that were not completed because of price. Further, this invention enables the feasible collection of various other types of market data such as geographic distribution and other characteristics of the buyers interested in a given product. In addition, it enables a superior way to gauge interest in future products and services.

Further, this invention's method of globally creating buying groups on a purchase by purchase basis brings a vast number of potential buyers to the bargaining table. Consequently, it provides a superior method of quickly moving large quantities of specific products. This will be useful to product suppliers in many ways. For example, a supplier might utilize the invention's sales platform to sell a substantial volume of one product for the specific purpose of increasing its market share. It even would be possible under this example for the supplier to specify a minimum sales volume so that no sales are made unless its market share objectives are met. In addition, a supplier could utilize this invention as a platform for unloading a large volume of specific products nearing the end of their product life cycle. Suppliers might also utilize this invention as a means to accomplish swift inventory leveling for cash flow or financial reporting purposes. While there are existing channels through which suppliers can sell closeout products or accomplish inventory leveling, none provide the ability to quickly move a substantial volume of inventory while still maximizing profit yield in the manner described above.

Finally, membership of any given broader special interest groups that can be created through this invention (e.g., camera enthusiasts) might epitomize the target customer for a particular product or service of a supplier. Possible ready access to such group, as possibly limited by each group membership, could be extremely valuable to suppliers for general marketing, product testing, and other purposes.

Definitions

Certain terms as used herein are defined as follows:

Browser: A specific type of client system, referring to an HTTP client enablling the display of various forms of information originating at the server; also capable of sending information, such as requests and personal data, to the server at the request of the end user. A browser is not the only possible or intended client system. Our method and apparatus apply only to the server, and are not dependent on what form of client is used, only that some client exists as the means of input.

Co-op: For the purposes of this application, the term 'co-op' as used throughout is not intended to refer to the traditional cooperative form of business which is owned by all of its members. A business organization implementing this invention need not be organized as a cooperative. Instead, we use the term 'co-op' to refer to the online manifestation of buying groups who have committed to purchase a certain product within a specified price (i.e., at or below a maximum price). Co-ops are also occasionally referred to herein as 'buying groups,' 'buying co-ops' and 'product co-ops.'

Critical Mass: The volume of acceptable offers necessary before any purchase offers will be accepted. The critical mass may be specified by a supplier. It may also be the sales volume at which the starting co-op price is justified.

Current Price: The price stated as current at any given time during the co-op. One significance of the current price is that availability is guaranteed for offers at or above such price after critical mass is achieved.

E-commerce Server: Is here used to refer to a specific server software system, residing on a set of CPUs, that is used to send information to the client system(s) and accepting input from said clients for the sole purpose of taking orders, whether they are for co-ops or not.

Ending Price: The price specified at the end of the co-op, which represents the price at which all offers are accepted.

Featured Product: Any product or product variant identified for sale through a co-op. For purposes of this application, the term 'featured product' includes any services which might be identified for sale through a co-op.

HTTP: The Hyper-Text Transfer Protocol.

HTTP Server: A specific server software system, residing on a set of CPUs, which is used to communicate with client systems such as HTTP browsers. The HTTP server is only one means of communication between the client and server, and its inclusion in this discussion of our invention is not meant to imply that it is the only means of implementation of the invention.

Offer or Purchase Offer: A binding, non-cancelable offer to purchase a featured product within a price range the maximum of which is specified by the buyer. Each such offer is guaranteed by the respective buyer's credit card at the time it is offered. Making an offer is a condition precedent to joining a co-op. The offer is either accepted or rejected at the close of the co-op.

Price Curve: A description of price as a function, in the mathematical sense, of the number of units. See FIG. 6.

Product and Product Variant: A product is a set of items for sale, which all has a certain set of significant characteristics in common. For example, a particular brand and style of in-line skates, each having the same characteristics, such as design, brand, color, a left and a right skate sold together, etc. A product variant is a subset of a product. For example, size 5 and size 8 of a particular pair of in-line skates are different variants of the same product. As used herein, a product can be a tangible or intangible object or a service.

Server: The term 'server' is here used to refer to the set of hardware and software systems that are used to implement co-ops in accordance with this invention. These systems are to be distinguished from the client systems that are used by buyers to participate in co-ops. See FIGS. 4 and 5.

Server Process: A computer program that is part of the server software systems, and which executes in its own address space, communicating with other processes via means defined by the operating system(s) of the hardware platforms. Unfortunately, it is necessary to use the term 'process' to describe other things than computer programs executing in their own address space in this application, so care has been taken to always use the term 'server process' when the latter is meant.

Starting Price: The price listed as the current price at the beginning of each co-op.

SUMMARY OF THE INVENTION

In accordance with a first aspect of the invention, a system for an on-line buying co-op includes an e-commerce server data processing system. The e-commerce server data processing system has e-commerce server software executable on the e-commerce server data processing system. The e-commerce server software is configured to define a buying co-op for a product by specifying the product for the co-op, a time interval within which members can join the co-op, the point at which critical mass is reached, any minimum or maximum quantity of the product available through the co-op, and one or more price curves for the featured product. The e-commerce server software is further configured to accept inputs from buyers to take orders for the product. A buyer client data processing system is coupled to the e-commerce server data processing system. The buyer client data processing system includes first client software executable on the buyer client data processing system. The first client software is configured to receive data from said e-commerce data processing system describing the buying co-op for the product, to display the data describing the buyer's co-op for the product on the buyer client data processing system, to receive buyer order inputs for the product and to transmit buyer order inputs for the product to the e-commerce server data processing system.

In a second aspect of the invention, an e-commerce server data processing system for implementing a buying co-op has e-commerce server software executable on the e-commerce server data processing system. The e-commerce server software is configured to define a buying co-op for a product by specifying the product for the co-op, a time interval during which the co-op is available, the point at which critical mass is reached, any minimum or maximum quantity of the product available through the co-op, and one or more price curves for the featured product. The e-commerce server software is further configured to accept inputs from buyers in the form of binding purchase offers to purchase the featured product.

In a third aspect of the invention a process for operating an on-line buying co-op includes defining a buying co-op for a product at an e-commerce server data processing system by specifying the product hr the co-op, a time interval during which the co-op is available, any minimum or maximum quantity of the product available through the co-op, and one or more price curves for the featured product. Data describing the buying co-op for the product is transmitted from the e-commerce data processing system to a buyer's data processing system. The data describing the buyer's co-op for the product is displayed on the buyer's data processing system. A buyer order input for the product is received on the buyer's data processing system. A buyer order input for the product is transmitted from the buyer's data processing system to the e-commerce server data processing system. The buyer order input is accepted in the e-commerce data processing system to record a purchase offer for the product.

In a fourth aspect of the invention, a process for defining an on-line buying co-op for a product in an e-commerce server data processing system includes specifying the product for the co-op. A time interval is specified during which the co-op is available. The point at which critical mass is reached is specified, which is usually a minimum quantity of the product specified either by a supplier or by the entity implementing the invention for a given price. Any maximum quantity of the product available through the co-op is specified. One or more price curves arc defined for the product available through the co-op.

In a fifth aspect of the invention, an article of manufacture comprises a computer readable storage medium having stored therein a computer program for operating various product co-ops simultaneously. The computer program includes a first code segment for defining a buying co-op for a product at an e-commerce server data processing system by specifying the product for the co-op, a time interval during which the co-op is available, the point at which critical mass is reached, usually a minimum quantity of the product for a given price, established as above, any maximum quantity of the product available through the co-op, and one or more price curves for the featured product. A second code segment is for transmitting data describing the buying co-op for the product from the e-commerce data processing system to a buyer's data processing system. A third code segment is for receiving purchase offer input in the e-commerce data processing system to record an offer for the product.

In a sixth aspect of the invention, an article of manufacture comprises a computer readable storage medium having stored therein a computer program for defining an on-line buying co-op. The computer program includes a first code segment which, when executed in a computer, specifies the product for the co-op. A second code segment, when executed in the computer, specifies a time interval for which the co-op is available. A third code segment, when executed in the computer, specifies any minimum or maximum quantity of the product available through the co-op. A fourth code segment, when executed in the computer, defines one or more price curves for the product available through the co-op.

Introductory Description of the Method

A co-op for a given product or product variant is defined by placing onto the e-commerce server a set of data describing the co-op in terms of its price curve(s), the featured product, the time interval during which the co-op is available, the point at which critical mass is reached, and the minimum and maximum quantities available. Some of these defining properties of a co-op may not be revealed to the buyer.

When the co-op is available, buyers enter their offers into the co-op, indicating a maximum price at which they will commit to purchase the featured item. This may be at the current price, or it may be below the current price. Once the current price is justified by the volume of co-op offers, all offers within a specified reasonable range below the current price will trigger a new, lower current price for the product.

Once the co-op is successful in achieving critical mass, offers at the current price guarantee availability of the number of items of the product or product variant specified in the offer, provided that number does not exceed the difference between the current number of similarly committed units and any maximum number of units available. Note that the starting price will be established when the co-op is announced, before any offers have been submitted based on the price curve and/or other merchandising data. Such starting price frequently will be based on a minimum number of units that must be ordered for the co-op to qualify for that price.

A further contingency maybe placed on a buyer's offer based on price. Specifically, should any given buyer indicate that he does not find the current price acceptable, but nevertheless wishes to buy it at a lower price, his offer is made contingent upon the co-op reaching the lower price. However, should his offer be deemed to fall within reasonable range of the current price, as defined separately for each co-op, it may be considered part of the market dynamics around the product offered in the co-op. As such, it may reduce the price of the co-op. As more offers are made, and the current price drops to a level at or below the contingent price specified, the contingency based on price is removed. Offers may be increased up to the current price any time during the co-op should buyers wish to improve their chance of success or ensure availability of the item. However, offers may not be cancelled nor may buyers reduce their offered price.

Regardless of the maximum price specified within each purchase offer, all members of the co-op get the benefit of the lowest final price.

In addition to seeing the current price go down, the buyers may also be given an indication of how many more participants it would take to get the price down to a specified amount, or potentially the number of acceptable offers necessary to reach critical mass. While every offer might affect the price by small decrements, the price reductions that are sufficiently compelling to encourage buyers to refer others to the co-op might be much greater and will vary from co-op to c-op. Therefore, a co-op is further defined by the 'price curve visibility window,' which is the difference in price that is deemed interesting to a buyer of a given product. The visibility window is in essence the granularity at which the actual price curve is displayed to buyers.

Merchandising and yield management personnel will define each co-op by means of data entry. Such data entry is not limited to time prior to the opening of a co-op. The definition of a co-op, including its price curve, is subject to modification during its lifetime. In fact, the ability to modify the co-op definition based on data gathered from offers to participate in a co-op is an essential aspect of the invention.

Once a buyer joins a particular co-op, he or she will be permitted to initiate e-mail messages designed to increase buyer volume, thereby further reducing the price available to all. The recipient of such e-mail will be directed back to the specific co-op by either a reply function or a link within the e-mail message. If be or she joins, he or she can then send messages to his or her friends and so on.

Once a co-op is closed, either because the prescribed time limit is met, or any maximum number of available items is sold, all offers at or above the closing price are accepted and final sales information is communicated to other server processes, which handle the orders' fulfillment via traditional means of hard and digital goods transportation. Buyers who made successful offers are notified of acceptance and product shipment, and those buyers whose offers were not successful are notified of the result.

In addition to participating in co-ops, buyers may utilize an input feature to suggest products or product categories for which they have an interest in a co-op being created. Further information is gathered regarding the buyers preferences including acceptable price, and such person is then notified at the time his or her items are sold by co-op. Other aspects of this function include a focal point or community for buyers to suggest and organize a wide variety of co-ops designed to suit their every need, including the ability to create sufficient demand to support purchases, the specific manufacture of particular products suggested by the various buyers, or the creation of broader interest groups around a category of products.

The attainment of the foregoing and related advantages and features of the invention should be more readily apparent to those skilled in the art, after review of the following more detailed description of the invention, taken together with the drawings, in which:

BRIEF DESCRIPTION OF THE DRAWINGS

FIGS. 1 and 2 are simplified diagrammatic representations of prior art sales models, useful for understanding the present invention.

FIG. 3 is a corresponding simplified diagrammatic representation of a sales model in accordance with the invention.

FIG. 4 is a block diagram of an internetworked computer system for implementing the invention.

FIG. 5 is a block diagram of software components for implementing the invention.

FIG. 6 is a graph of a price curve useful for understanding operation of the invention.

FIG. 7 is a more detailed block diagram of a portion of the software components in FIG. 5 for implementing the invention.

FIG. 8 is a flow chart illustrating operation of a preferred form of a process in accordance with the invention.

FIG. 9 is a graph including a price curve and other relationships useful for understanding operation of a price change and the price visibility window in accordance with the invention.

DESCRIPTION OF SPECIFIC EMBODIMENTS

The drawings show preferred forms of a system, process and pricing component suitable for implementing the invention.

Introductory Description of the Apparatus

As shown in FIGS. 4 and 5, merchandising and yield management staff 20 defines a co-op in accordance with the invention using client computer 22 and client software 24, comprised of a set of tools, including but not limited to a pricing tool. The tools 24 communicate with the server processes 26, including but not limited to the database process, to enter the data relevant to each co-op.

The consumer 28 accesses all aspects of the co-op using a client computer 30 running a browser 32 or some other type of client computer program. The client computer program 32 communicates via some means of physical communication layer 34, e.g. the Internet, with a server 36, i.e. the HTTP server, or a server with similar purpose. The HTTP server 36 further communicates, using public or proprietary protocols, with an e-commerce server 38, which contains the principal software for implementing this invention.

The e-commerce server 38 software and related components is comprised of a set of server processes 40, a means 42 of communication between the server processes 40, and a database 44 to hold data significant to the process of taking orders and otherwise interacting with the consumer 28. The capabilities of the e-commerce server software and related components extend far beyond the ability to handle co-ops. The present invention is directed to the capabilities that pertain to co-op management. The other capabilities of the e-commerce server 38 software and related components are implemented with software modules and routines known in the art and will not be described beyond that necessary to understand the invention.

As shown in FIG. 7, co-ops are primarily manifested by a set of database tables 50 that define the essential properties of the co-ops, a set of program subroutines 52 and server processes 54 and 56 defining the logical processing necessary to manage co-ops and their interaction with buyers, and data contained in the database tables 50 defining the values of the essential properties that define each co-op.

Detailed Description of the Method

FIG. 8 shows a flow diagram of a preferred form of a process in accordance with the invention.

Co-op Definition

The steps of the definition of a co-op are as follows:

1. The merchandising staff, being generally responsible for product offerings, identifies the product to be featured in co-op at 100. They create a new co-op at 102 using a set of computer programs acting as their data entry tools. Numerous co-ops will be featured simultaneously at any given time. Essential characteristics of the co-op in this preferred implementation are: start time, end time, any minimum number of units offered, any maximum number of units available for sale, starting price, and product cost curve including a price curve visibility window.

2. The co-op receives further definition by having its price curve and price curve visibility window defined at 104 using the pricing tool. The defined co-op is then made available at 106.

3. As data is gathered from buyers, by means of their making offers, the co-op is modified at 108 using the pricing tool, so as to take into account the market data in the definition of the price curve.

Co-op Selection

The steps comprising a buyer's selection of a co-op in which to participate, are as follows:

1. The buyer accesses e-commerce server 38 (FIG. 4) at 110, and is presented a number of co-op choices at 112. How the navigation and presentation of general product information pertaining to the co-op is done' not essential to this invention and is done in a conventional manner known to those skilled in the art. The buyer browses all product co-ops in order to choose a particular co-op of interest at 114.

2. The buyer is presented with the following essential co-op information: current price, closing time, next price level (as defined by the price curve visibility window and the price curve), sufficient for the buyer to determine the urgency of an offer.

Offers Below Current Price

Once a buyer has made up his mind to join a co-op, the decision must be made at 116 to accept the current price, guaranteeing availability once critical mass is achieved, or to make an offer contingent on a lower price range, which may not result in a successful purchase regardless of whether critical mass is achieved.

Given the decision to make an offer, the steps are as follows:

1. The buyer enters an offer which is the specific price at which he is willing to purchase the product, his credit card number and any other pertinent information at 118.

2. The system acknowledges his offer at 120.

3. The system authorizes his credit card for the maximum price specified in his offer.

4. If the offer is within the range that is deemed reasonable, the current price may be affected as defined by the price curve, and any new price is displayed.

5. If the offer is below what is deemed reasonable, the offer is still recorded, but it is disregarded from the pool of offers allowed to impact current price. The reasonable range may be derived from the price curve or external merchandising factors.

6. Should the current price drop to the level at or below which the offer was made at, such offer is included within the pool of offers to be accepted at close of the co-op at 122 and processed as such. Inventory is allocated to fulfill the order at 126 once the co-op closes at 124.

Offers at Current Price

Given the decision to make an offer at the co-op current price, the steps are as follows:

1. The buyer makes a non-cancelable offer to purchase the featured product at the current price at 128.

2. Inventory is allocated to fulfill the order at 126 once the co-op closes at 124.

3. The system acknowledges the offer, and indicates to the buyer that his offer is accepted at 130.

Co-op Close

A co-op will only close if the required critical mass is met. Assuming critical mass is achieved, the steps taken upon closing of a co-op are as follows:

1. The final price is fixed and applied to all offers at or above the final price.

2. All offers meeting the criteria above are accepted and converted to final sales by the e-commerce server, which are then communicated to product supplier and/or a fulfillment representative, which ships the products and charges the buyer's account.

3. All buyers that made successful offers are notified of the success thereof, and notified of the final price.

4. The buyers that made unsuccessful bids are likewise notified of the situation at 132.

Volume Building Communication Feature

Upon entering a co-op, buyers will be allowed an opportunity to e-mail friends and acquaintances to tell them about the extraordinary deal being offered in the co-op. Buyers help themselves to this feature, which is comprised of the following steps:

1. The buyer clicks on specific icon and is asked to supply certain information including the e-mail address of each addressee. The quantity of messages sent by any one buyer, and his or her ability to alter text describing the e-mail, may be limited.

2. The buyer may be able to type a personal message to be included within the fixed text of the message.

3. When the buyer indicates his desire to send each message, they are transmitted to the addresses indicated.

4. Such messages will provide direct access to the co-op page in question either through a reply function, or via a link in its text.

Buyer Suggestions

At any time potential buyers may utilize a process of suggesting specific products, brands or product categories to be offered in future co-ops. Such individual might also specify acceptable prices at which he or she would be willing to buy the suggested featured product, as well as a wide variety of other data. This feature is comprised of the following steps:

1. After identifying a specific product or a feature set common to several specific products, the buyer indicates to the system at 134 that he is interested in purchasing the product if it were to be offered at a low price under a co-op.

2. The buyer might further indicate what price he considers to be fair for the product, the brands he finds acceptable in order of preference.

3. The system accepts the suggestion at 136, and accumulation and organization of this data by product, feature set, brand, general product category, and/or any number of other criteria to permit meaningful utilization of the data adds it to its database.

4. If and when this data reveals interest sufficient to establish a co-op, the system then notifies the interested buyers via available communication means that the co-op is about to be established.

The invention provides a method and apparatus to permit the quick and convenient formation of any number of special interest groups wherein membership criteria can be defined in the manner most beneficial to the group. For example, those showing an interest in digital cameras, by joining a specific digital camera co-op or otherwise, could be asked whether they'd like to join a special interest group comprised of camera enthusiasts. The formation of such special interest groups is implemented as follows:

1. Buyer or potential buyer expresses interest in a certain type of featured product through browsing such product or joining a co-op or otherwise.

2. Buyer will be offered an opportunity to join one or more related special interest groups wherein he might be able to maximize access to related information of interest through global aggregation of similarly situated individuals.

3. Buyer elects to join one or more such groups.

4. The system might notify all members of a given group via available communication means of information of interest, including any future co-op likely to be of interest to such group.

Detailed Description of the Apparatus

The apparatus and software for practicing the preferred implementation of the invention is shown in FIGS. 4, 5 and 7.

Servers

The server systems are comprised of the following hardware and software components:

A set of computers 36, 38 and 140, having the standard definition of a computer system.

A set of server programs, configured to execute on said set of computers. The server programs consist of:

1. A set of database servers 56 holding the database tables and their data.

2. A set of e-commerce servers 54 that hold the executable commerce-related logic, interacting with the client via:

3. A set of HTTP servers 36, or other such servers with similar purpose, namely being dedicated to being the communication link between the client 32 and the e-commerce servers 54.

Database Tables

The apparatus is further comprised of a set of database tables 50, including, but not limited to:

*MC_COOP—defining the co-op in detail, including, but not limited to, these fields:

| | |
|---|---|
| ■ PRODUCT ID | The unique ID for thr product being offered |
| ■ MC_COOP_START_DATETIME | The date/time that the co-op is scheduled to open |
| ■ MC_COOP_FINISH_DATETIME | The date/time that the co-op is scheduled to close (might close early if sell all products) |
| ■ MC_COOP_MINIMUM_QUANTITY | The minimum quantity that we must sell |
| ■ MC_COOP_MAXIMUM_QUANTITY | The maximum quantity that we can sell |
| ■ MC_COOP_ORDER_QUANTITY_LIMIT | The limit on the # of items that can be ordered by a single customer |
| ■ MC_COOP_BID_REJECT_THRESHOLD | Price limit: below this price an offer is not considered "reasonable" |
| ■ MC_COOP_PRICING_SCHEME | Defines whether price curve is line segments or step-wise |
| ■ MC_COOP_COST_SCHEME | Defines whether cost curve is line segment or step-wise |
| ■ MC_COOP_IGNORE_SCHEME | Defines whether ignore curve is line segments or step-wise |
| ■ MC_COOP_STATUS | Overall status (not yet started, etc.) |
| ■ MC_COOP_WINDOW_PRICE | Height of price window (used to encourage customers to notify their friends) |
| ■ MC_COOP_CURRENT_PRICE | The current price for the co-op item (by definition, some point on the price curve) |

*MC_OFFER—defining the offers that have been made for co-op, including, but not limited to, these fields:

| | |
|---|---|
| ■ OID | A unique identifier for the offer |
| ■ MC_COOP_OID | The unique identifier for the co-op |
| ■ MC_OFFER_USER_ID | The unique identifier for the user who submitted the offer |
| ■ MC_OFFER_DATETIME | The date/time the offer was submitted (early offers get priority) |
| ■ MC_OFFER_PRICE | The price that was offered |
| ■ MC_OFFER_QUANTITY | The quantity that was requested |
| ■ MC_OFFER_SHOWN_PRICE | The current co-op price at the time the offer was made (to calculate savings) |
| ■ MC_OFFER_MERCATA_BUCKS_EARNED | Part of the loyalty management program |
| ■ MC_OFFER_SHIPPING_ALIAS | Identifies shipping destination (needed if offer becomes a real order) |
| ■ MC_OFFER_PAYMENT_ALIAS | Identifies payment method (needed if offer becomes a real order) |

A set of price curve tables, all with the same fields.

| | |
|---|---|
| * MC_COOP_PRICE_CURVE | defines the co-op price curve (or steps) |
| * MC_COOP_IGNORE_CURVE | Defines the co-op ignore curve (a "throttle" on the speed of the co-op) |
| * MC_COOP_COST_CURVE | Defining the points of the price curve for the co-op, including, but not limited to, these fields: |
| | 1. Coop_ID:     The co-op identifier that this price curve point is relevant for. |
| | 2. Threshold_Quantity:     The quantity coordinate for the price curve point. |
| | 3. Threshold_Price:     The price coordinate for the price curve point. |

MC_COOP_WISHLIST—defining the individual suggestions for new co-ops that have been made by various buyers.

Program Logic

The program logic of this invention consists of several components, shown in FIG. 5, all residing within the e-commerce servers 54. They include, but are not limited to:

1. Co-op display components 150, having the purpose of presenting information to the users via the HTTP servers and client browser software, and further interpreting the inputs of the users (merchandising staff as well as buyers) and translating those inputs into new presentation of information and/or manipulations of the data stored in the system.

The display components that are primarily relevant to this invention are:

| | |
|---|---|
| MC Product List | Display a list of products, showing co-op information |
| MC Product Details | Display a single product, showing co-op information |
| Co-op offer & checkout | Accept an offer from the user |
| E-mail a friend | Encourage participants to add to the co-op by sending e-mail to the friends |

The product list and product details modules show the co-op product description, price (with an animated image in the background to show that the price may fall even further), product features, etc. The co-op offer & checkout accepts an offer from a customer regardless of whether the offer is at the current price or at some lower price. We take the customer's name, e-mail address, shipping destination, credit card information, and the amount of the offer. We also show some legal text which informs the customer that this offer is binding and may be converted to a real order if the co-op price meets their offer amount, etc.

2. Data access components 26, having the purpose of translating database information into data that can be used to display information to buyers. These components are also responsible for updating information in the database based on interactions with the users via the various clients 24 and 32, HTTP servers 36, and co-op display components 150.

The data access components 26 that are primarily relevant to this invention include, but are not limited to:

* MCI_Co-op, responsible for providing information regarding, and manipulation of, individual co-ops. Manipulation actions include changing the current price, adding offers at or below the current price, modifying the price curve and the price curve visibility window.

*MCI_Co-op Manager, responsible for information regarding, and manipulation of, sets of co-ops. This manipulation includes finding co-ops with certain characteristics, creating new co-ops, and deleting co-ops that already exist.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A system for aggregating demand through an on-line buying group, which comprises:

(a) an e-commerce server data processing system, said e-commerce server data processing system including e-commerce server software executable on said e-commerce server data processing system and configured to define a buying co-op for a featured product by specifying the featured product for the co-op, a time interval during which the co-op is available, any minimum or maximum quantities of the featured product available through the co-op, and one or more price curves for the featured product available through the co-op, said e-commerce server software further being configured to receive offers from buyers and to take orders for the featured product upon seller acceptance of received buyer offers and said e-commerce server software also configured to notify a buyer who has made an unsuccessful offer and urge the buyer to make a new irrevocable offer at a higher price, prior to closing the buyer's co-op, which the seller may find acceptable; and (b) a buyer client data processing system coupled to said e-commerce server data processing system, said buyer client data processing system including first client software executable on said buyer client data processing system and configured to receive data from said e-commerce data processing system describing the buying co-op for the featured product, to display the data describing the buyer's co-op for the featured product on the buyer client data processing system, and to receive buyer order inputs that include the buyer's offer for the featured product and to transmit the buyer order inputs for the featured product to said e-commerce server data processing system.

2. The system of claim 1 additionally comprising:

(c) a merchandising staff client data processing system, said merchandising staff client data processing system including second client software executable on said merchandising staff client data processing system and configured to receive merchandising staff inputs for defining a buying co-op for the featured product.

3. The system of claim 2 in which said second client software is further configured by including a pricing tool to establish a price curve for the featured product in the buying co-op.

4. The system of claim 3 in which said second client software is further configured by including data entry tools to establish a start time and an end time for the buyer's co-op, any minimum or maximum quantities of the featured product and a starting price for the featured product.

5. The system of claim 1 in which said first client software is further configured to receive irrevocable purchase offers from buyers wherein they commit to buy the featured product within a price range, the maximum of which is the current price established for the featured product in the buying co-op.

6. The system of claim 5 in which said first client software is further configured to receive a buyer order input in terms of an irrevocable, non-cancelable offer to purchase the featured product within a price range, the maximum of which is below the current price established for the featured product in the buying co-op.

7. The system of claim 6 in which said e-commerce software is further configured to accept the irrevocable, noncancelable offer in response to additional increased volume of binding offers to purchase the featured product in the buying co-op.

8. The system for an on-line buying co-op of claim 5 in which said first client software is further configured to receive credit card numbers from buyers to guarantee received irrevocable purchase offers.

9. The system of claim 1 in which said e-commerce server software is further configured to close the buyer's co-op when either the time interval for the co-op has expired, or the maximum quantity of the featured product has been allocated to irrevocable purchase offers falling within a range deemed acceptable by the one or more price curves for the featured product.

10. The system of claim 9 in which said e-commerce software is further configured to calculate a final sales price for the featured product based on acceptable offers received and the quantity of the featured product that has been committed, to provide order fulfillment instructions for offers that have been accepted, and to notice successful buyers that their offers have been accepted.

11. The system of claim 1 in which said first client software is configured to receive buyer inputs suggesting one or more products or product categories for a future buying co-op.

12. The system of claim 1 in which said e-commerce server software is further configured to notify a buyer when a critical mass has been reached in order for a price for the featured product to drop to a level that equals a price offered by the buyer.

13. An e-commerce server data processing system for implementing an online buying co-op, said e-commerce server data processing system including e-commerce server software executable on said e-commerce server data processing system and configured to define a buying co-op for a featured product by specifying the featured product for the co-op, a time interval for which the co-op is available, any minimum or maximum quantity of the featured product available through the co-op, one or more price curves for the featured product available through the co-op, said e-commerce server software further being configured to accept offers from buyers for the featured product, and said e-commerce server being further configured to modify the one or more price curves during the time interval for which the co-op is available.

14. The e-commerce data processing system for implementing an on-line buying co-op of claim 13 in which said e-commerce server software is further configured to close the buyer's co-op when either the time interval for the co-op has expired and the minimum quantity of the featured product has been committed through acceptable purchase offers, or the maximum quantity of the featured product has been committed through acceptable purchase offers.

15. The e-commerce data processing system for implementing an on-line buying co-op of claim 14 which said e-commerce software is further configured to calculate a final sales price for the featured product based on the quantity of the featured product that has been allocated to acceptable offers from buyers, to provide order fulfillment instructions for offers that have been accepted and to notify those who submitted successful offers that their offers lave been accepted.

16. The e-commerce data processing system for implementing an on-line buying co-op of claim 15 in which said e-commerce software is further configured to notify those who submitted successful offers an amount of the final sales price for the featured product.

17. The e-commerce data processing system for implementing an on-line buying co-op of claim 15 in which said e-commerce software is further configured to notify those who submitted unsuccessful offers that their offers have been rejected.

18. The e-commerce data processing system for implementing an on-line buying co-op of claim 13 in which said e-commerce software is further configured to render a buyer's offer for the featured product acceptable once the current price equals the offer price.

19. The e-commerce data processing system for implementing an on-line buying co-op of claim 13 in which said e-commerce server software is further configured to notify a buyer when a critical mass has been reached such that the seller will accept offers for a price that equals a price offered by the buyer.

20. The e-commerce data processing system for implementing an on-line buying co-op of claim 13 in which said e-commerce server software is further configured to notify a buyer who has made an unsuccessful offer for a price falling within a reasonable range prior to closing the buyer's co-op to urge the buyer to make a new irrevocable offer.

21. A process for operating an on-line buying co-op, which comprises:
 (a) defining a buying co-op for a featured product at an e-commerce server data processing system by specifying the featured product for the co-op, a time interval for which the co-op is available, any minimum or maximum quantity of the featured product available though the co-op, and one or more price curves for the featured product available through the co-op;
 (b) transmitting data describing the buying co-op for the featured product from the e-commerce data processing system to a buyer's data processing system;
 (c) displaying the data describing the buying co-op for the featured product on the buyer's data processing system;
 (d) receiving a buyer's purchase offer for the featured product on the buyer's data processing system;
 (e) transmitting the buyer's purchase offer for the featured product from the buyer's data processing system to the e-commerce server data processing system;
 (f) recording the buyer's purchase offer for the featured product in the e-commerce data processing system; and
 (g) modifying the one or more price curves during the time interval for which the co-op is available.

22. The process for operating an on-line buying co-op of claim 21 additionally comprising:
 (g) closing the buying co-op when either the time interval for the co-op has expired, as the same may be extended from time to time, or the maximum quantity of the featured product has been allocated to acceptable offers from buyers, and (h) accepting the offers from the buyers to purchase the featured product at a price no lower than the price of the featured product when the co-op is closed.

23. The process for operating an on-line buying co-op of claim 22 additionally comprising:
   (i) calculating the final sales price for the featured product based on the ending co-op price;
   (j) providing order fulfillment instructions for accepted offers;
   (k) notifying successful buyers that their offers were accepted, an ending price at which their credit card will be charged at time of shipping, and the estimated time of shipping; and
   (l) notifying unsuccessful buyers that their offers have been declined.

24. The process for operating an on-line buying co-op of claim 21 in which defining the buying co-op includes receiving merchandising staff inputs in the e-commerce server data processing system for defining the buying co-op for the featured product.

25. The process for operating an on-line buying co-op of claim 21 in which the recorded buyer's purchase offer is an offer to buy the featured product within a price range that includes a current price established for the featured product in the buying co-op.

26. The process for operating an on-line buying co-op of claim 21 in which the recorded buyer's purchase offer is an irrevocable offer to purchase the featured product within a price range that is below the current price.

27. The process for operating an on-line buying co-op of claim 21 additionally comprising:
   (g) receiving a buyer input on the buyer's data processing system suggesting a product, product category, brand, acceptable price or any other information relevant to the formation of future buying co-ops; and
   (h) transmitting the buyer input suggesting a product or other information relating to a future buying co-op from the buyer's data processing system to the e-commerce sewer data processing system.

28. A process for defining an on-line buying co-op for a featured product in an e-commerce server data processing system, which comprises:
   (a) specifying the featured product for the co-op;
   (b) specifying a time interval during which the co-op is available; and
   (c) defining one or more price curves for the featured product available through the co-op; and
   (d) modifying the one or more price curves during the time interval for which the co-op is available.

29. The process for defining an on-line buying co-op of claim 28 additionally comprising:
   (d) receiving merchandising staff inputs in the e-commerce server data processing system for defining the buying co-op for the featured product prior to specifying the featured product for the co-op.

30. The process for defining an on-line buying co-op of claim 28, further comprising:
   (d) specifying at least a minimum quantity of the featured product available through the co-op that must be allocated to buyers through irrevocable offers to purchase the featured product for the co-op to achieve a critical mass.

31. An article of manufacture, which comprises a computer readable storage medium having stored therein a computer program for defining an on-line buying co-op, which comprises:
   (a) a first code segment which, when executed in a computer, specifies the featured product for the co-op;
   (b) a second code segment which, when executed in the computer, specifies a time interval for which the co-op is available;
   (c) a third code segment which, when executed in the computer, specifies at least a minimum quantity of the featured product available through the co-op;
   (d) a fourth code segment which, when executed in the computer, defines a price curve for the featured product available through the co-op; and
   (e) a fifth code segment which, when executed in the computer, defines whether buyer offers for the featured product arc acceptable.

32. The article of manufacture of claim 31 in which the software additionally comprises:
   (f) a sixth code segment which, when executed in the computer, receives merchandising staff inputs in the computer for defining the buying co-op for the featured product.

33. A system for aggregating demand through an on-line buying group, which comprises:
   (a) an e-commerce sewer data processing system, said e-commerce server data processing system including e-commerce server software executable on said e-commerce server data processing system and configured to define a buying co-op for a featured product by specifying the featured product for the co-op, a time interval during which the co-op is available, any minimum or maximum quantities of the featured product available through the co-op, and one or more price curves for the featured product available through the co-op, said e-commerce server software further being configured to accept offers from buyers for the featured product and said e-commerce server being further configured to modify the one or more price curves during the time interval for which the co-op is available; and
   (b) a buyer client data processing system coupled to said e-commerce server data processing system, said buyer client data processing system including first client software executable on said buyer client data processing system and configured to receive data from said e-commerce data processing system describing the buying co-op for the featured product, to display the data describing the buyer's co-op for the featured product on the buyer client data processing system, to receive buyer order inputs that include the buyer's offer for the featured product and to transmit the buyer order inputs for the featured product to said e-commerce server data processing system, and to receive buyer inputs for sending an e-mail message to other potential buyers who the buyer believes might be interested in the buying co-op.

* * * * *

UNITED STATES PATENT AND TRADEMARK OFFICE
CERTIFICATE OF CORRECTION

PATENT NO.   : 6,631,356 B1  
DATED        : October 7, 2003  
INVENTOR(S)  : Tom Van Horn, Nikas Gustafsson and Dale Woodford It is certified that error appears in the above-identified patent and that said Letters Patent is hereby corrected as shown below:

Colum 17,
Line 34, replace "notice" with -- notify --.

Column 18,
Line 2, insert -- in -- after the words "claim 14".

Column 20,
Line 20, replace "arc" with -- are --.

Column 30,
Line 29, replace "sewer" with -- server --.

Signed and Sealed this

Fifteenth Day of June, 2004

JON W. DUDAS
*Acting Director of the United States Patent and Trademark Office*